(12) United States Patent
Gross et al.

(10) Patent No.: US 6,880,426 B2
(45) Date of Patent: Apr. 19, 2005

(54) PARKING BRAKE FOR A MOTOR VEHICLE

(75) Inventors: Markus Gross, Raisting (DE); Michael Lorenz, Schaerding (AT); Ulf Braker, Berlin (DE); Markus Boehm, Remscheid (DE); Markus Feise, Weinstadt (DE); Juergen Gropp, Schweikheim (DE)

(73) Assignee: Edscha AG, Remscheid (DE)

( * ) Notice: Subject to any disclaimer, the term of this patent is extended or adjusted under 35 U.S.C. 154(b) by 105 days.

(21) Appl. No.: 10/195,926

(22) Filed: Jul. 16, 2002

(65) Prior Publication Data

US 2003/0132070 A1 Jul. 17, 2003

(30) Foreign Application Priority Data

Jul. 17, 2001 (DE) .......................... 101 34 569

(51) Int. Cl.⁷ ............................... G05G 1/14
(52) U.S. Cl. ................. 74/512; 74/513; 74/500.5; 74/502.2; 384/416; 384/428
(58) Field of Search ............. 74/501.6, 502.2, 74/512, 513, 500.5, 501.5 R, 535; 384/275, 276, 295, 296, 416, 428, 438, 439

(56) References Cited

U.S. PATENT DOCUMENTS

| | | | | |
|---|---|---|---|---|
| 3,809,434 A | * | 5/1974 | Lindner ..................... 359/524 |
| 4,570,508 A | * | 2/1986 | Nicholson et al. ............. 74/535 |
| 4,612,823 A | * | 9/1986 | De Leeuw et al. ........... 74/533 |
| 4,841,798 A | * | 6/1989 | Porter et al. ........... 74/501.5 R |
| 4,850,242 A | * | 7/1989 | Hass et al. ..................... 74/512 |
| 4,872,368 A | * | 10/1989 | Porter .......................... 74/542 |
| 4,949,592 A | * | 8/1990 | Yamazaki et al. ............. 74/512 |
| 5,178,237 A | * | 1/1993 | Ursel et al. .............. 188/106 P |
| 5,182,963 A | * | 2/1993 | Perisho et al. ................ 74/512 |
| 5,309,786 A | * | 5/1994 | Pare et al. ..................... 74/512 |
| 5,533,420 A | * | 7/1996 | Perisho ......................... 74/512 |
| 5,775,174 A | | 7/1998 | Kanbe et al. ................ 74/542 |

FOREIGN PATENT DOCUMENTS

| | | |
|---|---|---|
| DE | 2746389 | 4/1979 |
| DE | 3924937 | 2/1990 |
| DE | 4013284 | 10/1991 |
| DE | 19629048 | 1/1997 |

* cited by examiner

Primary Examiner—William C. Joyce
Assistant Examiner—Julie K. Smith
(74) Attorney, Agent, or Firm—Davidson, Davidson & Kappel, LLC

(57) ABSTRACT

A parking brake for a motor vehicle includes an actuating lever supported rotatably about an axis, a catch element, a pawl element connected to a release device and capable of being brought into engagement with the catch element, a pull cable connected to the actuating lever, two support plates, and a bearing device. The catch element is formed on the actuating lever, and the actuating lever and the pawl element are held between the support plates. In addition, the bearing device is placed between the support plates, the actuating lever being mounted by the bearing device in a manner such that it can rotate about the axis. The bearing device includes steps and is secured between the support plates by the steps in a manner such that the bearing device does not overhang on an outside of said support plates.

15 Claims, 3 Drawing Sheets

PARKING BRAKE FOR A MOTOR VEHICLE

Priority to German Patent Application No. 101 34 569.0-21, filed Jul. 17, 2001 and hereby incorporated by reference herein, is claimed.

BACKGROUND INFORMATION

The present invention relates to a parking brake for a motor vehicle, including an actuating lever, said actuating lever being supported rotatably about an axis, a catch element; a pawl element, said pawl element being able to be brought into engagement with said catch element and being connected to a release device, and a pull cable, said pull cable being connected to the actuating lever.

A multiplicity of embodiments of hand- or foot-actuated parking brakes are known from motor-vehicle construction practice. Generally, parking brakes of this type are based on the principle that when a rotatably mounted actuating lever is actuated, a pull cable, which is fastened to the actuating lever or is connected to the latter via a further mechanism and is connected at the other end to a motor-vehicle brake, is moved. The lever is locked in an actuated position of the brake by means of a catch which comprises a plurality of teeth and in which a spring-actuated detent pawl element engages. In order to release the brake, the detent pawl element is released from the catch by actuation, for example, of a push-button by means of a linkage, a restoring force produced by the pull cable itself or by further spring means resetting the actuating lever into its starting position.

Parking brakes are generally either arranged as hand-actuated parking brakes in the region of the transmission tunnel, which is provided at the same time for storage options, or as foot-operated parking brakes in the foot well on the driver's side. As a rule, a parking brake is actuated only before the beginning and after the end of a journey. It is therefore desirable to be able to produce parking brakes in as small a size and as cost-effectively as possible. In addition, in order to optimize the assembly sequences in the motor-vehicle construction, a parking brake is to be present as a subassembly which is premanufactured to as large an extent as possible and which can be fitted with little outlay.

U.S. Pat. No. 4,872,368 describes a cable operating apparatus, in particular a foot-operated parking brake, comprising an actuating lever which is arranged between two mounting brackets. The actuating lever is rotatably supported by means of a pivot pin feeding through an annular bushing and extending over the outside of the mounting brackets. This and further features, in particular the general shape of the mounting brackets, the diameter of the actuating lever in direction of its axis of rotation and the lateral mounting of a ratchet means to the actuating lever, cause a significant total width of the apparatus in the direction of the axis of rotation of the actuating lever.

SUMMARY OF THE INVENTION

It is an object of the present invention to provide a parking brake, which can be produced cost-effectively.

It is a further object of the present invention to provide a parking brake, which is of small size, in particular of small width in the direction of the axis of rotation of the actuating lever.

It is a further object of the present invention to provide a parking brake, which can be fitted in a motor vehicle as a premanufactured subassembly.

It is a further object of the present invention to provide a parking brake which shows a reduced development of noise by the pawl element when the parking brake is actuated.

According to the present invention, these and other objects are achieved.

A first embodiment of the present invention provides a parking brake for a motor vehicle, comprising an actuating lever, said actuating lever being supported rotatably about an axis; a catch element; a pawl element, said pawl element being able to be brought into engagement with said catch element and being connected to a release device; a pull cable, said pull cable being connected to the actuating lever; two support plates and a bearing device; wherein said catch element is formed on said actuating lever; and wherein said actuating lever and said pawl element are held between said support plates; wherein said bearing device is placed between said support plates, said actuating lever being mounted by said bearing device in a manner such that it can rotate about said axis, and wherein said bearing device is secured between said support plates by means of steps in such a manner that said bearing device does not overhang on the outside of said support plates.

Another embodiment of the present invention provides a parking brake for a motor vehicle, comprising an actuating lever, said actuating lever being supported rotatably about an axis; a catch element; a pawl element, said pawl element being able to be brought into engagement with said catch element and being connected to a release device; a pull cable, said pull cable being connected to the actuating lever; two support plates; and a connector, said connector being formed out as hollow rivets, said hollow rivets having stepped edges; wherein said support plates are connected to each other in a spaced apart manner by means of said connector; wherein said catch element is formed on said actuating lever; and wherein said actuating lever and said pawl element are held between said support plates.

Another embodiment of the present invention provides a parking brake for a motor vehicle, comprising an actuating lever, said actuating lever being supported rotatably about an axis; a catch element; a pawl element, said pawl element being able to be brought into engagement with said catch element and being connected to a release device; a pull cable, said pull cable being connected to the actuating lever; and two support plates; wherein said catch element is formed on said actuating lever; wherein said actuating lever and said pawl element are held between said support plates; wherein said release device comprises a release lever, a release spring and a connecting part; and wherein said release lever engages in a sliding manner on said pawl element.

Still another embodiment of the present invention provides a parking brake for a motor vehicle, comprising an actuating lever, said actuating lever being supported rotatably about an axis; a catch element; a pawl element, said pawl element being able to be brought into engagement with said catch element and being connected to a release device; a pull cable, said pull cable being connected to the actuating lever; two support plates; and a stop ring; wherein said catch element is formed on said actuating lever; wherein said actuating lever and said pawl element are held between said support plates; and wherein a starting position and a maximum end position of said actuating lever is determined at the same time by said actuating lever, which can be rotated about said axis, striking against said stop ring.

Advantageously, two lateral support plates are provided here between which both the actuating lever and the catch element and also the pawl element are arranged lying in a plane. Altogether, this stack-like arrangement of three levels of flat components provides a simple parking brake which is of particularly flat construction in the direction of the rotational axis of the actuating lever and has a small number of components, the components generally being present as flat sheet-metal shaped parts and it being possible to produce them cost-effectively by punching or embossing.

The actuating lever is advantageously formed as a two-part plate body, the catch element, as a separate component which consists of a harder material than the actuating element, being placed or clamped in a form-fitting manner in corresponding recesses on the actuating lever.

The support plates advantageously in each case comprise a sheet-metal shaped part, embossing and punching processing steps being used to provide a sheet-metal plate with formations which are suitable for securing the moveable parts of the parking brake which are arranged between the support plates. The support plates are preferably fastened to one another in a spaced apart manner by means of hollow rivets, screwing of the parking brake to the vehicle bodywork preferably taking place by means of screws reaching through the hollow rivets. This screwing confers additional strength on the previously described stack of parts. In order to avoid an overhang, caused by the screws, hollow rivets or other connecting devices reaching through the support plates, over the outer side of the surfaces of the support plates, the support plates are additionally provided with corresponding hollows in the region of the means reaching through them.

A bearing device is preferably placed between the support plates, said bearing device reaching through a circular recess in the actuating lever and thus mounting the latter in a rotatable manner between the support plates. The bearing device is secured between the support plates by means of steps in such a manner that it does not have an overhang on the outside of the support plates, which enables a particularly narrow construction of the parking brake to be kept to.

In a particularly preferred manner, a release device for the pawl element is also arranged secured between the support plates and by the support plates in a plane together with the actuating lever and the pawl element. In this case, the release lever is in sliding contact with the pawl element in order, when the release lever is rotated by cable-pull actuation, to carry along the pawl lever in such a manner that the pawl lever and the catch element become disengaged. This arrangement of a release lever which is separated from the pawl lever can advantageously result in a reduced development of noise by the pawl lever when the parking brake is actuated. In addition, the sliding carrying-along of the pawl lever by the release lever permits a favorable transmission ratio for the transmission of force from the release lever to the pawl lever.

In a preferred embodiment of the parking brake according to the present invention, a stop ring, which is preferably rubber-coated, is secured between the support plates and, by means of suitable formation of the actuating lever, at the same time forms a stop for a starting position and a maximum end position of the actuating lever, as a result of which the number of required components is kept low.

In order to avoid further components, a resetting of the actuating lever into its starting position after release of the parking brake is preferably brought about by a resetting force of the brake pull cable. As an alternative, however, a further spring means for resetting the actuating lever may also be provided.

An actuating sensor, which is secured on the support plates and, in the starting position of the actuating lever, is supported against the latter is preferably provided, said actuating sensor being suitable for producing an electric signal which indicates an actuation of the foot-operated parking brake.

The extension of the parking brake in the direction of the rotational axis of the actuating lever is preferably less than 30 mm and particularly preferably approximately 20 mm. This very flat configuration of the parking brake makes it advantageously possible to provide the parking brake even when there is very restricted fitting space in a motor vehicle.

All in all, the construction of the parking brake according to the present invention is suitable for preassembling the entire parking brake, in which case, when it is fitted into the motor vehicle, a premanufactured subassembly has only to be fastened to the motor vehicle by means of screw-like connecting means and the cable pulls have to be fitted to the device, and so a rapid and simple fitting of the parking brake into a motor vehicle is ensured.

Further features and advantages of the parking brake according to the present invention result from the exemplary embodiment described below and from the dependent claims.

BRIEF DESCRIPTION OF THE DRAWINGS

In the following, a preferred exemplary embodiment of a parking brake according to the present invention will be described and explained in greater detail with reference to the attached drawings.

DETAILED DESCRIPTION OF A PREFERRED EMBODIMENT

Figure 1:
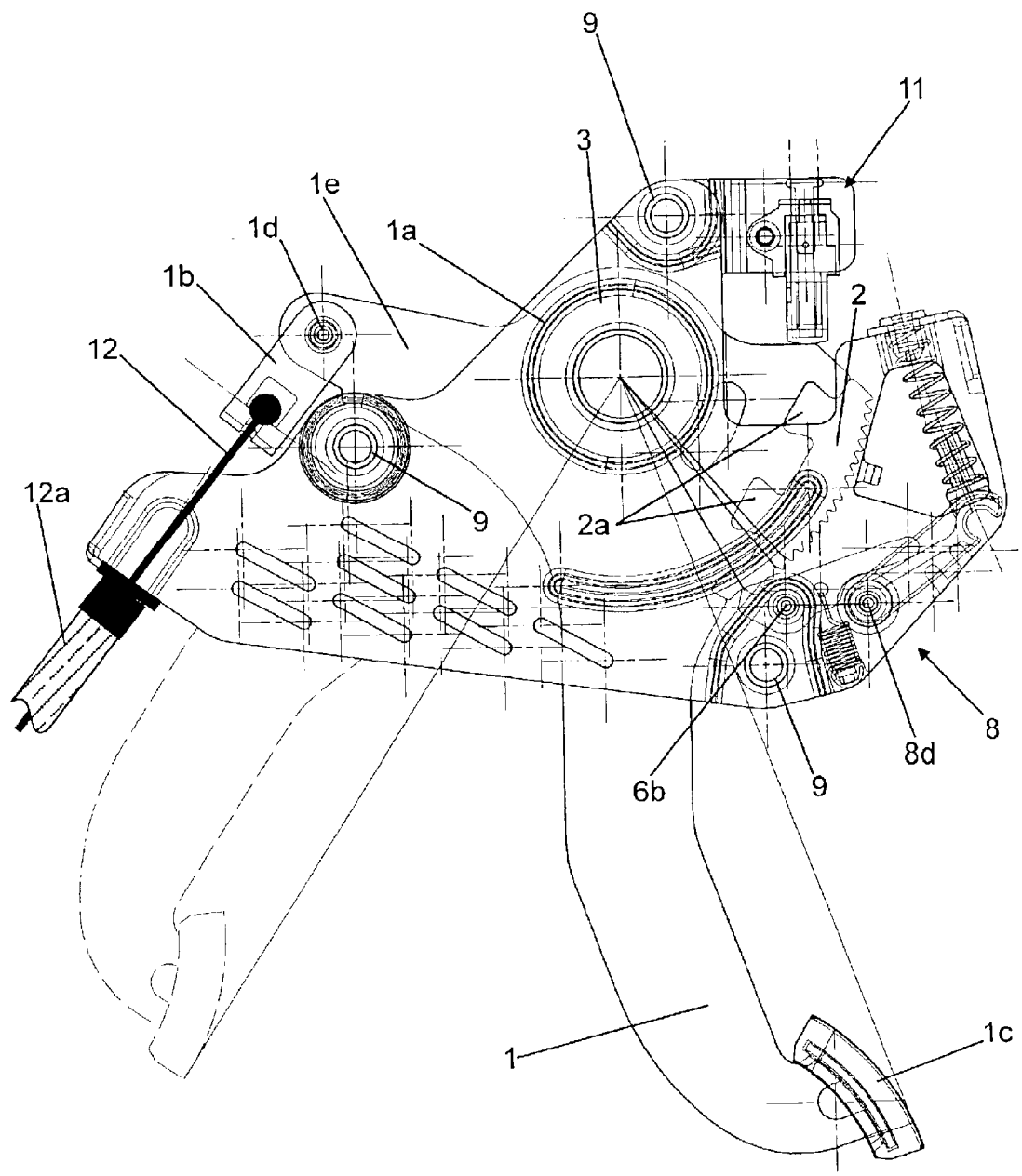
FIG. 1 shows a schematic side view of a parking brake according to the present invention.
Figure 2:
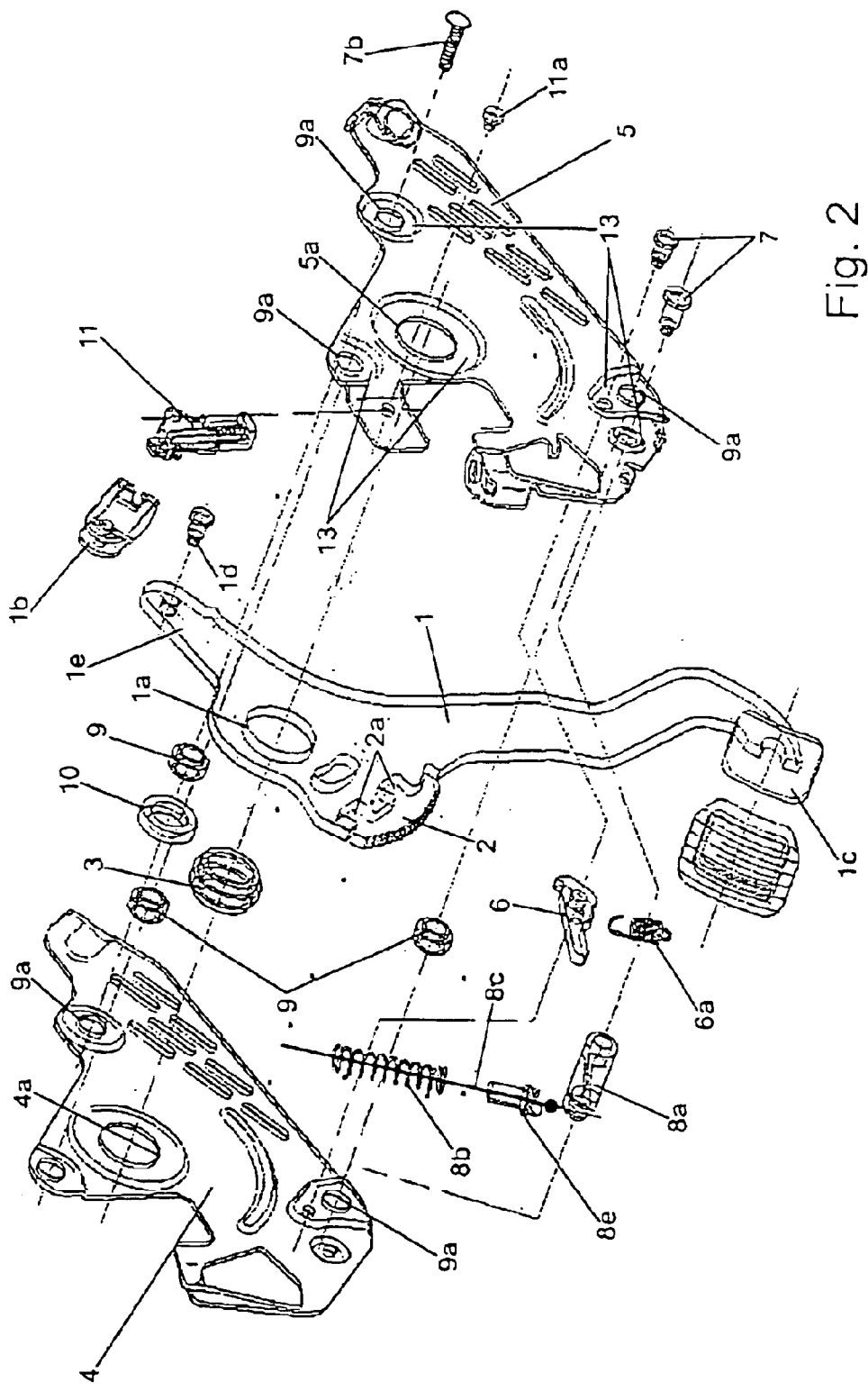
FIG. 2 shows an exploded drawing of the parking brake from FIG. 1.

The parking brake shown in FIGS. 1–2 includes an actuating lever 1, which is designed as a plate-like shaped body. Its shaping and the attachment of a pedal plate 1c enables the actuating lever 1 to be formed as an actuating lever of a foot-operated parking brake. A catch element 2 is inserted by means of extensions in a clamping manner into cutouts which correspond to the extensions and are formed on the actuating lever 1, with the result that the catch element 2 lies in a plane together with the actuating lever 1. The catch element 2 consists of a harder material than the actuating lever 1. Furthermore, a circular aperture 1a is formed on the actuating lever 1, said aperture serving for the rotatable mounting of the actuating lever and engaging around a bearing device 3. A holder 1b which is designed as a sheet-metal shaped part and is intended for the cable end of a pull cable 12 is attached rotatably by means of a rivet 1d to an elongate formation 1e of the actuating lever.

Two support plates 4, 5 are arranged on both sides of the actuating lever, stepped, circular apertures 4a, 5a serving to secure the bearing device 3 which is engaged around by the circular recess 1a of the actuating lever 1. The bearing device 3 has, in order to secure it in the apertures 4a, 5a, stepped edges which are held in the apertures in such a manner that the bearing device or its securing means does not overhang on the outside of the support plates 4, 5.

Furthermore, corresponding formations and inserted stepped rivets 7 are used to secure a pawl element 6 and a release device 8, which comprises a release lever 8a, a connecting part 8e, a release spring 8b and a release cable pull 8c, between the support plates. The pawl element 6 is connected to a pawl spring 6a with which a support plate 5 is acted upon by force. The release lever 8a is supported against the support plate 5 by means of the connecting part 8e and the release spring 8b. The connecting part 8e is used for guiding the release spring 8b. The release cable pull 8c is accommodated in the release lever 8a.

The two support plates 4, 5 are secured to each other in a spaced apart manner by means of three hollow rivets 9. The hollow rivets 9 are provided with steps and are pressed or clamped in each case into holes 9a on the inside of the support plates 4, 5, it being possible for the entire parking brake to be fastened on the bodywork of a motor vehicle by means of screws 7b reaching through the holes 9a and the hollow rivets 9. The securing of the hollow rivets 9 in each case on the inside of the support plates 4, 5 is designed in such a manner that it does not overhang on the outside of the support plates 4, 5 in the region of the hollow rivets 9.

One of the three hollow rivets 9 is additionally engaged around by a stop ring 10, the positioning of the stop ring and the shaping of the actuating lever 1 being designed in such a manner that the stop ring 10 simultaneously defines a starting position of the actuating lever 1 and a maximum end position of the actuating lever 1. The location of the stop is situated in the region of the elongate formation 1e, for the starting position, and, for the maximum end position, in the region of an elongate part of the actuating lever 1, which part forms a lever arm and supports the pedal plate 1c.

An actuating sensor 11 is fastened by means of a screw 11a on a tab-shaped formation on the one support plate 5 in such a manner that the actuating sensor 11, which functions in the manner of an electric push-button switch, is pressed in by a formation of the actuating lever in a starting position of the actuating lever.

Furthermore, hollows 13 are formed on the support plates, said hollows preventing, in the regions in which the support plates are reached through by the screws (not illustrated), the hollow rivets 9, the stepped rivets 7 or the bearing device 3, the head-side regions of the means reaching through from overhanging over the outer side of the surface of the support plates 4, 5.

Figure 3:
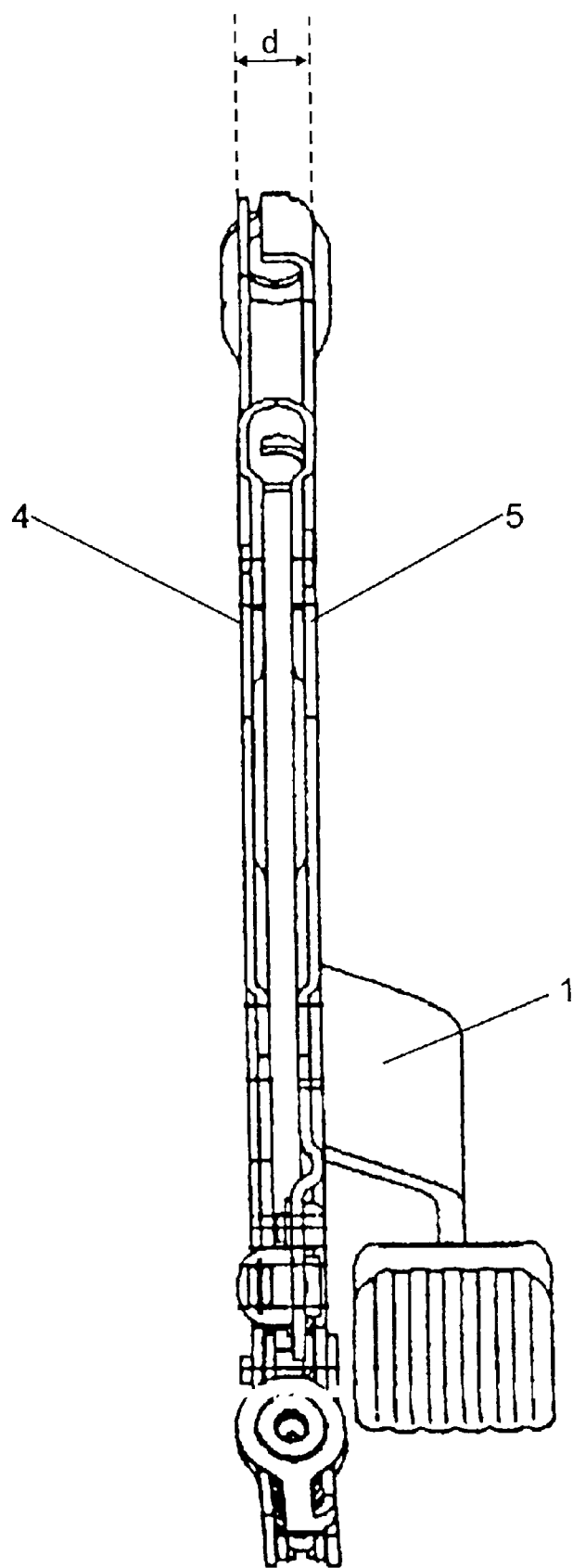
FIG. 3 shows a plan view from above of the parking brake from FIG. 1.

It can be seen in particular from FIG. 3 that the parking brake according to the present invention is of particularly narrow construction. A distance d of the two support plates 4 is 20 mm over the substantial part of the support plates.

The present invention functions as follows:

In the starting position of the parking brake, which is illustrated in FIG. 1 by the actuating lever 1 drawn by solid lines, the actuating sensor 11 is pressed in by the actuating lever 1. The release lever 8a is acted upon by a force by means of the release cable pull 8c, with the result that the release spring 8b presses the release lever 8a into a basic position in which the pawl element 6 is held in engagement with the catch element 2 by means of the pawl spring 6a. When the actuating lever 1 is actuated, the actuating lever 1 is rotated according to FIG. 1 in the clockwise direction, the pull cable 12, which is placed in the holding device 1b, is fastened on the actuating lever 1 and whose sheathing 12a is supported against the support plate 5, is retracted in order thereby to actuate the brake of the motor vehicle. During the movement of the actuating lever 1 from its starting position into an actuating position, which is indicated in FIG. 1 by an outline of the actuating lever 1 in dashed lines, the pawl element 6 jumps continuously along the teeth of the catch element 2. In the actuated position of the brake, the pull cable 12 exerts a restoring force counterclockwise on the actuating lever 1, a movement of the actuating lever 1 counterclockwise being blocked by the engagement of the pawl element 6 in the catch element 2. In the actuated position, the actuating sensor 11 is not in contact with the actuating lever 1, with the result that a different electric signal which indicates an actuation of the foot-operated parking brake can be obtained from the actuating sensor 11.

In order to release the parking brake again, the release cable pull 8c is pulled. In the process, the release lever 8a is rotated counterclockwise about its bearing point 8d. The release lever 8a engages on an extended portion of the pawl element 6, which leads to the pawl element 6 rotating about its bearing point 6b counterclockwise and counter to the force of the pawl spring 6a. This disengages the pawl element 6 from the catch element 2, and the restoring force of the pull cable 12 results in the actuating lever 1 rotating counterclockwise back into the starting position which is defined by the actuating lever 1 abutting against the stop ring 10.

If too much slackness is present in the pull cable 12 or if there is a defect is because of a torn pull cable 12, the stop ring 10 is also used for restricting the travel of the actuating lever 1 in the actuating direction, which prevents the pawl element from being able to slip behind the catch element and an undefined, jammed state of the foot-operated parking brake from being able to occur.

What is claimed is:

1. A parking brake for a motor vehicle, comprising
an actuating lever, said actuating lever being supported rotatably about an axis;
a catch element formed on said actuating lever;
a pawl element, said pawl element capable of being brought into engagement with said catch element, said pawl element being connected to a release device;
a pull cable, said pull cable being connected to the actuating lever;
two support plates, wherein said actuating lever and said pawl element are held between said two support plates; and
a bearing device;
wherein said bearing device is placed between said support plates, said actuating lever being mounted by said bearing device in a manner such that it can rotate about said axis; and
wherein said bearing device includes steps, said bearing device being secured between said support plates by the steps in a manner such that said bearing device is totally encompassed by said two support plates and does not overhang on an outside of said support plates.

2. The parking brake as claimed in claim 1, wherein the release device is arranged between the support plates lying in a plane together with the actuating lever and the pawl element.

3. The parking brake as claimed in claim 1, wherein the catch element is formed as a separate component insertable in a form-fitting manner into corresponding recesses on the actuating lever, and wherein the catch element consists of a harder material than the actuating lever.

4. The parking brake as claimed in claim 1, wherein the actuating lever is formed as a plate body.

5. The parking brake as claimed in claim 1, wherein the support plates, the actuating lever, the catch element, the pawl element and the release device form a stack-like arrangement of three levels of flat components in a premanufactured subassembly, the premanufactured subassembly capable of being fitted in the motor vehicle.

6. The parking brake as claimed in claim 1, wherein the support plates each comprise a sheet-metal shaped part and having a plurality of apertures and steps.

7. The parking brake as claimed claim 1, wherein the support plates are connected to each other in a spaced apart manner using at least one connector.

8. The parking brake as claimed in claim 7, wherein the support plates are capable of being mounted on the motor vehicle using at least one screw reaching through said at least one connector.

9. The parking brake as claimed in claim 1, wherein the pawl element is secured on the support plates in a manner such that it is mounted rotatably and is acted upon by a pawl spring.

10. The parking brake as claimed in claim 1, wherein the actuating lever is acted upon by the pull cable with a force pressing the actuating lever towards a starting position.

11. The parking brake as claimed in claim 1, further comprising an actuating sensor for producing an electric signal upon an actuation of the actuating lever.

12. The parking brake as claimed in claim 1, wherein a distance between the outer surfaces of the support plates does not exceed 30 mm, over a major portion of the support plates.

13. The parking brake as claimed in claim 1, wherein a distance between the outer surfaces of the support plates does not exceed 20 mm, over a major part of the support plates.

14. The parking brake as claimed in claim 1, wherein the support plates include at least one hollow on an outside of the support plate.

15. The parking brake as claimed in claim 1, wherein the actuating lever is for foot actuation.

* * * * *

UNITED STATES PATENT AND TRADEMARK OFFICE
CERTIFICATE OF CORRECTION

PATENT NO. : 6,880,426 B2  
APPLICATION NO. : 10/195926  
DATED : April 19, 2005  
INVENTOR(S) : Gross et al.

Page 1 of 1

It is certified that error appears in the above-identified patent and that said Letters Patent is hereby corrected as shown below:

On the Title page item (73), should read: Assignees: Edscha AG, Remscheid (DE); DaimlerChrysler AG, Stuttgart (DE)

Signed and Sealed this

Fifth Day of August, 2008

JON W. DUDAS  
*Director of the United States Patent and Trademark Office*